US006768422B2

(12) United States Patent
Schofield et al.

(10) Patent No.: US 6,768,422 B2
(45) Date of Patent: Jul. 27, 2004

(54) PRECIPITATION SENSOR

(75) Inventors: Kenneth Schofield, Holland, MI (US); Mark L Larson, Grand Haven, MI (US); Brent J Bos, Tucson, AZ (US); Niall R Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 82 days.

(21) Appl. No.: 10/059,769

(22) Filed: Jan. 29, 2002

(65) Prior Publication Data

US 2002/0121972 A1 Sep. 5, 2002

Related U.S. Application Data

(63) Continuation of application No. 09/530,306, filed as application No. PCT/US98/23062 on Oct. 30, 1998, now Pat. No. 6,353,392, and a continuation-in-part of application No. 09/992,441, filed on Nov. 16, 2001, now Pat. No. 6,559,435, which is a continuation of application No. 09/599,979, filed on Jun. 22, 2000, now Pat. No. 6,320,176, which is a continuation of application No. 09/135,565, filed on Aug. 17, 1998, now Pat. No. 6,097,023

(60) Provisional application No. 60/064,335, filed on Oct. 30, 1997.

(51) Int. Cl.[7] .............................................. G08B 21/00
(52) U.S. Cl. ..................... 340/602; 340/601; 250/208.1
(58) Field of Search ................................. 340/601, 602, 340/933; 250/208.1, 227.25, 341.7, 339.1, 573; 318/444, 483, DIG. 2; 15/250.001, 250.12, DIG. 15

(56) References Cited

U.S. PATENT DOCUMENTS

| 4,236,099 A | 11/1980 | Rosenblum ................... 315/83 |
| 4,355,271 A | 10/1982 | Noack ......................... 318/480 |
| 4,481,450 A | 11/1984 | Watanabe et al. ........... 318/444 |

(List continued on next page.)

FOREIGN PATENT DOCUMENTS

| DE | 2946561 A | 5/1981 |
| DE | 4139515 A1 | 6/1992 |
| DE | 4123641 A1 | 1/1993 |
| FR | 2641237 A | 7/1990 |
| JP | 6243543 | 2/1987 |
| WO | WO 8605147 A | 9/1986 |
| WO | 9427262 | 11/1994 |
| WO | 9814974 | 4/1998 |
| WO | 9914088 | 5/1999 |
| WO | 9923828 | 5/1999 |

OTHER PUBLICATIONS

Article entitled "Generation of Vision Technology," published by VLSI Vision Limited, publication date unknown.
Article entitled "On–Chip CMOS Sensors for VLSI Imaging Systems," published by VLSI Vision Limited, 1991.

(List continued on next page.)

*Primary Examiner*—Van T. Trieu
(74) *Attorney, Agent, or Firm*—Van Dyke, Gardner, Linn & Burkhart, LLP (57) ABSTRACT

A vehicular precipitation sensor which detects precipitation on a vehicle window includes an imaging array sensor directed at the vehicle window from inside the vehicle, and a control operable to detect precipitation at a surface of the vehicle window in response to an output of the imaging array sensor. The imaging array sensor includes a plurality of pixels which sense a light value of incident radiation. The control controls an accessory of the vehicle in response to the precipitation detected reaching a threshold level of precipitation. The threshold level of detected precipitation is preferably adjustable in response to a level of ambient light present at the window. The rain sensor may include an illumination device which is preferably operable in a pulse mode, whereby the control is operable to reduce noise of the output of the imaging array sensor as a function of the pulse mode.

75 Claims, 7 Drawing Sheets

U.S. PATENT DOCUMENTS

| | | | | |
|---|---|---|---|---|
| 4,620,141 | A | 10/1986 | McCumber et al. | 318/483 |
| 4,692,798 | A | 9/1987 | Seko et al. | |
| 4,867,561 | A | 9/1989 | Fujii et al. | 356/237 |
| 4,871,917 | A | 10/1989 | O'Farrell et al. | 250/341 |
| 4,956,591 | A | 9/1990 | Schierbeek et al. | 318/483 |
| 5,059,877 | A | 10/1991 | Teder | 318/444 |
| 5,182,502 | A | 1/1993 | Slotkowski et al. | 315/159 |
| 5,313,072 | A | 5/1994 | Vachss | 250/573 |
| 5,329,206 | A | 7/1994 | Slotkowski et al. | 315/159 |
| 5,336,980 | A | 8/1994 | Levers | 318/444 |
| 5,414,257 | A | 5/1995 | Stanton | 250/227.25 |
| 5,426,294 | A | 6/1995 | Kobayashi et al. | 250/226 |
| 5,453,676 | A * | 9/1995 | Agrotis et al. | 318/444 |
| 5,471,515 | A | 11/1995 | Fossum et al. | 377/60 |
| 5,498,866 | A | 3/1996 | Bendicks et al. | 250/227.25 |
| 5,537,003 | A | 7/1996 | Bechtel et al. | 315/82 |
| 5,550,677 | A | 8/1996 | Schofield et al. | 359/604 |
| 5,661,303 | A | 8/1997 | Teder | 250/341.8 |
| 5,670,935 | A | 9/1997 | Schofield et al. | 340/461 |
| 5,796,094 | A | 8/1998 | Schofield et al. | 250/208 |
| 5,837,994 | A | 11/1998 | Stam et al. | 250/208.1 |
| 5,844,682 | A | 12/1998 | Kijomoto et al. | 356/369 |
| 5,877,897 | A | 3/1999 | Schofield et al. | 359/604 |
| 5,923,027 | A | 7/1999 | Stam et al. | 250/208.1 |
| 5,949,331 | A | 9/1999 | Schofield et al. | 340/461 |
| 5,990,469 | A | 11/1999 | Bechtel et al. | 250/208.1 |
| 5,998,929 | A * | 12/1999 | Bechtel et al. | 315/82 |
| 6,020,704 | A | 2/2000 | Buschur | 318/483 |
| 6,084,519 | A * | 7/2000 | Coulling et al. | 340/602 |
| 6,087,953 | A | 7/2000 | DeLine et al. | 340/815.4 |
| 6,097,023 | A | 8/2000 | Schofield et al. | 250/208.1 |
| 6,097,024 | A | 8/2000 | Stam et al. | 250/208.1 |
| 6,118,383 | A * | 9/2000 | Hegyi | 340/602 |
| 6,124,886 | A | 9/2000 | DeLine et al. | 348/148 |
| 6,144,022 | A | 11/2000 | Tenenbaum et al. | 250/208.1 |
| 6,172,613 | B1 | 1/2001 | DeLine et al. | 340/815.4 |
| 6,222,447 | B1 | 4/2001 | Schofield et al. | 340/461 |
| 6,313,454 | B1 | 11/2001 | Bos et al. | 250/208.1 |
| 6,320,176 | B1 | 11/2001 | Schofield et al. | 250/208.1 |
| 6,611,610 | B1 * | 8/2003 | Stam et al. | 340/930 |

OTHER PUBLICATIONS

Commonly Assigned, copending U.S. patent application, Ser. No. 09/441,341, filed Nov. 16, 1999 by Kenneth (NMI) Schofield, Mark L. Larson and Keith J. Vadas for Vehicle Headlight Control Using Imaging Sensor.

Commonly Assigned, copending U.S. patent application, Ser. No. 09/992,441, filed Nov. 16, 2001 by Kenneth (NMI) Schofield, Mark L. Larson and Keith J. Vadas for Vehicle Headlight Control Using Imaging Sensor.

Commonly Assigned, copending U.S. patent application, Ser. No. 10/011,517, filed Nov. 5, 2001 by Brent J. Bos, Kenneth (NMI) Schofield, Mark L. Larson and Niall R. Lynam for Interior Rearview Mirror System Including a Forward Facing Video Device.

* cited by examiner

PRECIPITATION SENSOR

CROSS-REFERENCE TO RELATED APPLICATIONS

This is a continuation of U.S. pat. application, Ser. No. 09/530,306, filed Apr. 27, 2000 by Kenneth Schofield et al. for RAIN SENSOR WITH FOG DISCRIMINATIONS, now U.S. Pat. No. 6,353,392 (Attorney Docket No. DON01 P-708A), which is a 371 national phase application of International PCT Application No. PCT/US98/23062, filed Oct. 30, 1998 (Attorney Docket No. DON01 FP-708(PCT)), which claims priority on U.S. provisional application, Ser. No. 60/064,335, filed Oct. 30, 1997 (Attorney Docket No. DON01 P-674), and a continuation-in-part of U.S. pat. application, Ser. No. 09/992,441, filed Nov. 16, 2001 by Schofield et al. for VEHICLE HEADLIGHT CONTROL USING IMAGING SENSOR, now U.S. Pat. No. 6,559,435 (Attorney Docket DON01 P-933), which is a continuation of U.S. pat. application, Ser. No. 09/599,979, filed June 22, 2000 by Schofield et al. for VEHICLE RAIN SENSOR USING IMAGING SENSOR, now U.S. Pat. No. 6,320,176 (Attorney Docket No. DON01 P-816), which is a continuation of U.S. pat. application, Ser. No. 09/135,565, filed on Aug. 17, 1998 by Schofield et al. for VEHICLE HEADLAMP CONTROL USING IMAGING SENSOR, now U.S. Pat. No. 6,097,023 (Attorney Docket No. DON01 P-699), which are all hereby incorporated herein by reference in their entireties.

BACKGROUND OF THE INVENTION

This invention relates generally to vehicle moisture detection systems which detect precipitation on an outer surface of a vehicle window or windshield and, more particularly, to a rain detector which is decoupled from the windshield and capable of separately detecting both rain on an exterior surface and fog on an interior surface of the window.

Several rain sensor systems have been proposed. Early attempts were typically closely coupled to the interior surface of the windshield, such as by bonding to the glass surface or the like. The problem with such closely coupled units is that they create difficulty in the necessity to handle two different windshield configurations in the factory, which increases inventory costs. Also, the close coupling creates a difficulty in the replacement of the windshield in the after market. This is a result from the necessity to replace the rain sensor on the windshield after the windshield has been replaced. The other difficulty with closely coupled rain sensor units is that the close proximity of the units to the glass surface results in a relatively small sampling area. Therefore, in order to achieve an adequate sampling area, closely coupled units increase the number of sampling channels which results in the increase of cost and bulk to the unit.

In order to avoid concerns with replacing a windshield as it may become broken or cracked, and other deficiencies with units coupled to the windshield, other devices have been proposed that are decoupled from the windshield such that the sensor is spaced from the interior surface of the windshield. However, such a system is not good at determining when the signal it receives is due to rain droplets on the exterior of the windshield or due to fog particles on the interior surface of the windshield. Therefore, fog on the inside of the windshield may result in a false rain signal to the system, which may lead to the windshield wipers being turned on when there is no moisture present on the exterior surface of the windshield.

Other systems have been proposed to decouple the rain sensor from the windshield in order to overcome some of the disadvantages of previously proposed systems. One such device orients an illumination source and an illumination sensor at an acute angle relative one another such that when the light is redirected by fog droplets on the inner surface of windshield, it is not received by the sensor, while light that is refracted through the windshield and further reflected by water droplets on the exterior surface of the windshield may be received by the sensor, thereby supposedly detecting rain droplets on the exterior surface of the windshield. While such a device may arguably reduce the likelihood of a false signal of rain when there is only fog present on the interior surface of the windshield, the device does not determine that fog is present on the interior surface. Therefore, such a device has not been proposed for use with a blower or ventilation system of the vehicle to activate the blower and eliminate the fog as it becomes present on the interior surface of the windshield.

Another proposal in which the rain sensor is decoupled from the windshield is disclosed in an international patent application to Dennis Hegyi, published Nov. 24, 1994, under international publication number WO 94/27262. Although the device disclosed in Hegyi overcomes some of the difficulties of the prior art, it is not without its own difficulties. Hegyi recognizes that having the unit spaced from the windshield again allows inner surface interference, such as from fog or other moisture collecting on the inner surface of the windshield, as well as from cabin smoke and the like coming between the sensor and windshield. Although Hegyi purports to discriminate rain on the exterior of the windshield and fog on the interior of the windshield, the results have not been totally satisfactory. The Hegyi unit is an integrating sensor which integrates the output of a photo detector over time in order to attempt to detect either rain on the exterior of the windshield or fog on the interior of the windshield. Such an integrating sensor tends to dilute the impact of any individual phenomena, such as a raindrop or a particle of fog, thereby reducing the ability to detect such phenomena.

Typically, the illumination sources implemented in these rain sensors are LEDs or laser diodes, which project an infrared signal toward the windshield. Due to the wavelengths of the infrared signals, the signals are substantially invisible to a human eye and transmit readily through a standard vehicle windshield. However, vehicle manufacturers have developed filter characteristics within certain windows and windshields that substantially reduce the amount of near infrared light that may transmit through the glass and into the vehicle, thereby avoiding solar loading within the vehicle by infrared radiation radiating from the sun. While these filter characteristics are generally inefficient and allow a range of near infrared wavelengths in the proximity of visible light to transmit therethrough, they substantially hinder the effectiveness of a typical infrared emitting LED implemented in a conventional rain sensor.

SUMMARY OF THE INVENTION

The present invention is intended to provide a vehicular rain sensor which accurately detects rain on the windshield under a wide variety of operating conditions, including the presence of fog on the windshield interior, and provides the ability to separately detect the presence of rain or fog on a window of a vehicle.

According to an aspect of the invention, a rain sensor which senses rain and/or fog on a vehicle window includes an imaging array sensor directed toward a vehicle window and a control which responds to an output of the imaging array sensor in order to indicate precipitation on an exterior surface of the window.

According to another aspect of the invention, the control may include a computer programmed with an edge detection algorithm, for detecting the edges of droplets of rain as they appear on the exterior surface of the windshield. The control may be coupled to a windshield wiper such that the wipers are turned on when a predetermined threshold value of precipitation is detected on the window. An illumination source may also be implemented for illuminating the window when ambient light levels are low.

According to another aspect of the invention, an optic may be included between the imaging array sensor and the windshield. The optic has a low f-ratio which provides a narrow depth of field to the imaging array sensor, such that only the area immediately adjacent the windshield is in focus on the imaging array sensor. The imaging array sensor and optic are oriented relative the windshield to satisfy the Scheimpflug condition such that the optic focuses an entire sampling area of the windshield onto the correspondingly angled imaging array sensor.

According to another aspect of the invention, the vehicle rain sensor includes a polarizing filter that is at least occasionally positioned in an optical path between the illumination source and the sensor to filter out polarized light radiated from a fog particle on the inside of the window. The control responds to a signal from the sensor in order to indicate precipitation on an exterior surface of the window independent of moisture on an interior surface of the window.

According to still yet another aspect of the present invention, a vehicle rain sensor for detecting rain or fog on a vehicle window comprises at least one illumination source and at least one illumination sensor, having at least one optic path therebetween. At least one of the optic paths is defined between at least one of the illumination sources and the vehicle window, and between the vehicle window and at least one of the illumination sensors. A polarizing filter is positioned along at least one of the optic paths, and a control responds to an output of at least one of the illumination sensors in order to indicate precipitation on an exterior surface of the window or fog on an interior surface of the window. The control may communicate with the vehicle windshield wipers and/or the rear window wipers when rain is detected on the exterior surface of the window and communicate with a blower within the vehicle to activate the blower when fog is detected on the interior surface of the window.

The invention provides a new principle of rain detection which is decoupled from the windshield and accurately detects the presence of rain on the windshield and distinguishes rain from other phenomena which could be confused with rain, such as fog. The invention further accurately provides for the separate detection of fog, thereby allowing further measures to be taken to improve driver visibility.

These and other object, advantages and features of this invention will become apparent upon review of the following specification in conjunction with the drawings.

DESCRIPTION OF THE PREFERRED EMBODIMENT

Figure 1:
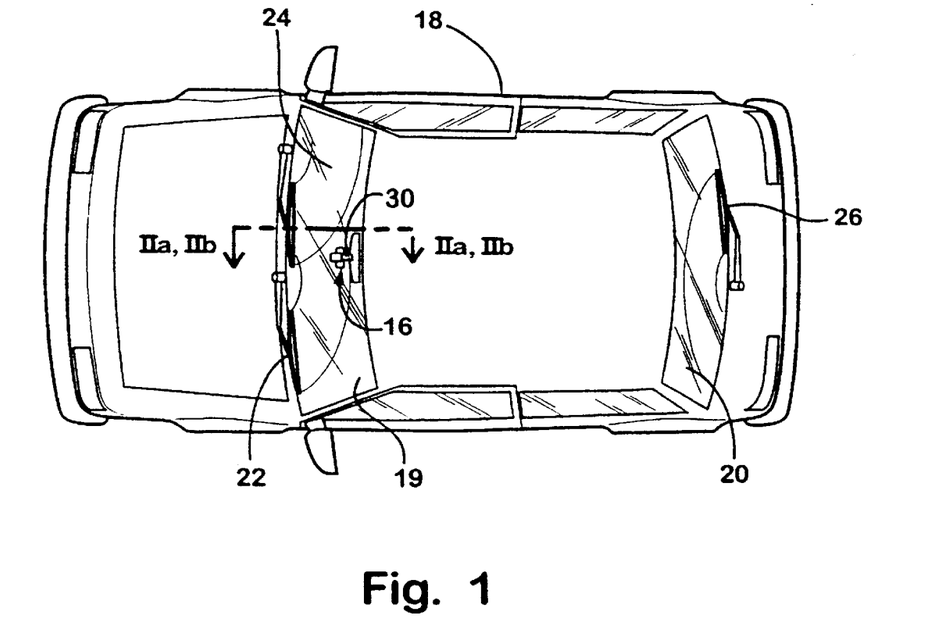
FIG. 1 is a top view of a vehicle with a rain sensor with fog discrimination according to the present invention installed therein.
Figure 2A:
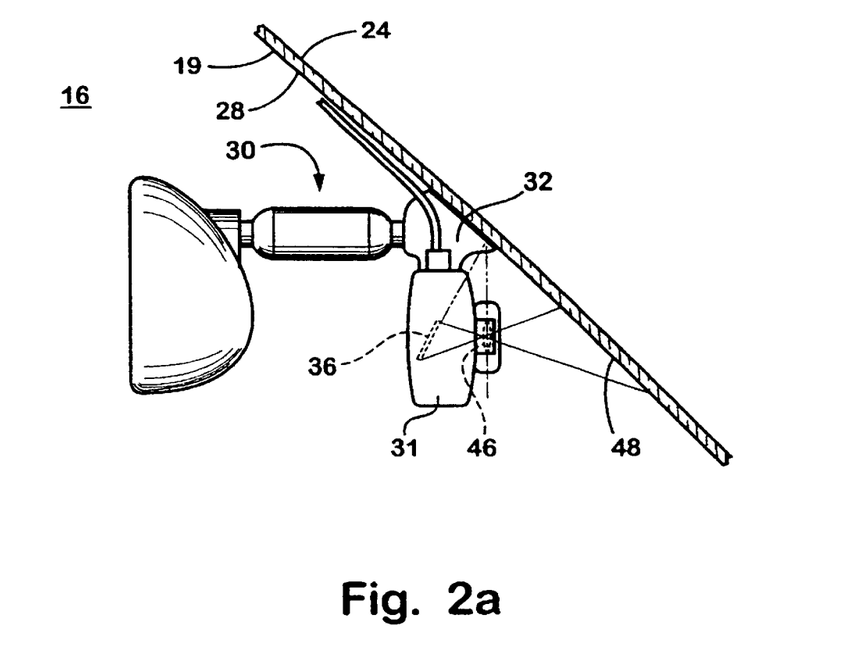
FIG. 2a is a sectional view taken along line II—II in FIG. 1.

Referring now specifically to the drawings and the illustrative embodiments depicted therein, a vehicle rain sensor system, generally illustrated at 16, is positioned inside a vehicle 18 and directed toward a sampling area 48 of a window 19, which is illustrated as a windshield of vehicle 18 also having a rear window 20 (FIG. 1). Vehicle 18 may be automobile, a light truck, a van, a large truck, a sport utility vehicle or the like. Vehicle 18 further includes windshield wipers 22 for wiping precipitation from an exterior surface 24 of window 19 and may also include a rear window wiper 26 for clearing rear window 20 of precipitation as it accumulates thereon. Rain sensor system 16 is conveniently incorporated in a rear view mirror assembly 30 attached to an interior surface 28 of front window, or to the roof above the front window, by a mounting bracket 32, which is typically secured or bonded to interior surface 28 of window 19 by adhesive or the like (FIG. 2). Rain sensor 16 is preferably mounted within a pod 31 suspended from bracket 32 such that rain sensor system 16 is spaced from, or decoupled from, interior surface 28 of window 19. Such a pod 31 may of the type disclosed in commonly assigned U.S. Pat. Nos. 5,576,687 and 5,708,410 issued to Blank et al., the disclosures of which are hereby incorporated herein by reference.

Rain sensor system 16 of the present invention includes an illumination sensor, or detector 36, which is preferably a multi-element, electro-optic, pixelated imaging array sensor, such as a CMOS imaging array, CCD imaging array sensor or the like, a detailed description of which is disclosed in commonly assigned U.S. Pat. No. 5,670,935, issued to Schofield et al., the disclosure of which is hereby incorporated herein by reference. By mounting rain sensor system 16 in a rear view mirror bracket such that illumination detector 36 is directed toward the front of the vehicle, rain sensor system 16 may be adapted to also operate as a head lamp controller, as disclosed in commonly assigned U.S. Pat. No. 5,796,094 issued to Schofield et al., the disclosure of which is hereby incorporated herein by reference. Furthermore, illumination detector 36 may be adapted to function as a component of an active cruise control system, whereby the detector functions to determine the speed at which the vehicle is travelling. Alternatively, if the rain sensor system disclosed herein were mounted such that illumination detector 36 were facing rearward, toward rear window 20 of vehicle 18, illumination detector 36 may be adapted to function as a component of a vehicle back-up aid system.

Figure 3A:
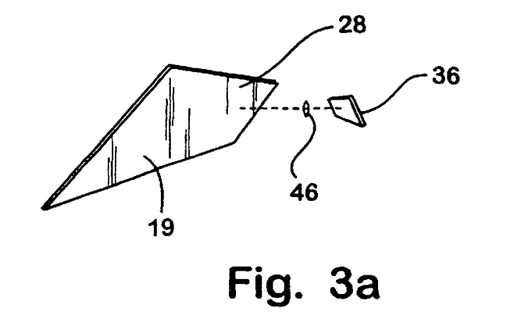
FIGS. 3a-c are graphical illustrations of the geometric relationship of the elements of FIG. 1 in three dimensions.
Figure 3B:
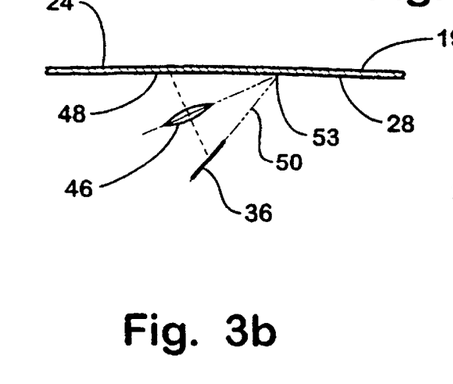
Figure 3C:
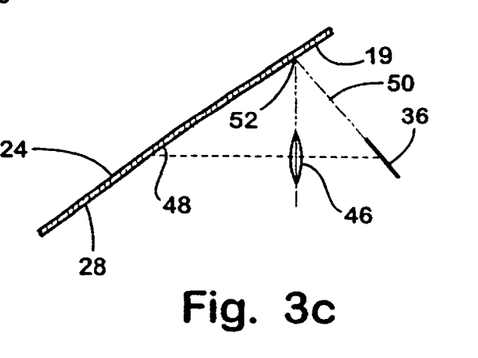

Illumination detector 36 is preferably a multi-element imaging array mounted behind an optic lens 46 that is positioned between detector 36 and windshield 19. Lens 46 is preferably designed to have a small f-ratio in a range between approximately 0.8 and approximately 1.1, and a long focal length, preferably as long as possible while still encompassing sampling area 48. This provides a narrow depth of field of the image, which results in detector 36 receiving a focused image of only the area immediately forward and rearward of window 19. Imaging array detector 36, lens 46 and window 19 are all oriented relative one another according to the Scheimpflug relationship, which results in scenic information of sampling area 48 on window 19 being in focus on detector 36, not withstanding the small f-ratio and long focal length of the optic. This relationship is commonly known in the field of optical engineering and is illustrated in FIGS. 3a-c by a plane 49 passing through lens 46 and a plane, shown by dashed line 50, extending along detector 36, both of which intersect a plane defined by window 19 at a line 52 (FIG. 3c). This relationship applies three dimensionally, with plane 49 passing through lens 46 and plane 50 extending along detector 36 intersecting the plane defined by window 19 at the same line 53 (FIG. 3b). By orienting detector 36, lens 46 and window 19 in such a fashion, the entire angled surface of sampling area 48 on window 19 will be brought into focus on the angled surface of detector 36.

Figure 4:
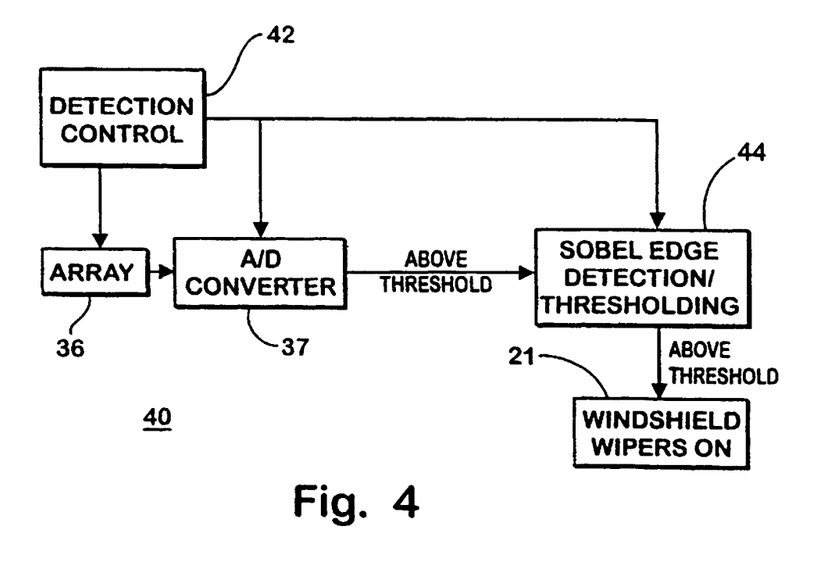
FIG. 4 is a block diagram of an electronic control circuit.

As shown in FIG. 4, rain sensor 16 includes an electronic control 40 having an A/D converter 37 which converts the analog information captured by imaging array 36 into digital format for use in processing by an edge detection function 44. If the edge detection function detects the presence of rain droplets, a windshield wiper control 21 turns on the windshield wipers 22 and/or modulates the wiper speed in proportion to the quantity of droplets detected. Control 40 further includes a detection control function 42 which coordinates operation of the various components of control 40 so that individual capture frames of array 36 are grabbed and processed. Preferably, the functions of control 40 are integrated in a programmed computer or micro-computer, but may be individually provided as discreet analog or digital components. If array 36 includes interface circuitry capable of producing digital signals, the need for A/D converter 37 may be obviated. By the terms control and /or computer as used herein, it is envisioned that the present invention may include a micro-computer with an embedded control application, a custom digital logic circuit, a digital signal processor circuit or the like, which may be adaptable to be positioned within or in the vicinity of a rear view mirror housing.

Edge detection function, shown generally at 44 in FIG. 4, analyzes the signal from illumination detector 36 and determines the number of precipitation droplets present on exterior surface 24 by detecting the edge of each droplet and further determining if the number of edges detected is above a predetermined threshold value. Edge detection function 44 allows imaging array detector 36 to interrogate many complex patterns on a surface of window 19, instead of integrating them together and thereby diluting the impact of the effects. The edge detection function isolates and identifies the individual phenomenon that become present on exterior surface 24 of window 19, which allows the system to separate out the multiple effects of the phenomena, rather than integrating them together. Such an edge detection algorithm is commercially available and is marketed by MathWorks as a MATLAB image processing toolbox EDGE routine. Alternately, an edge detection/thresholding algorithm may be used that uses the Roberts, Prewitt, or Sobel approximation to the derivative, which are generally known in the art. While these algorithms are available and have been used to test and evaluate the present invention, it is important to note that many edge detection algorithms are commercially available and a skilled artisan would select the appropriate algorithm for each application of the present invention. For example, an edge detection algorithm may analyze precipitation droplets in a linear manner, where the algorithm enhances the edges as received by the imaging array detector and counts the contiguous droplets present within the sampling area. Alternatively, an edge detection algorithm may enhance and then further analyze the droplets according to the number of droplets and the size of their contiguous edges or other characteristics. Therefore, by implementing an imaging array sensor for illumination detector 36 and further utilizing an edge detection algorithm 44, the effects of fog on the interior surface 28 of window 19, and of other interferences, may be reduced as the rain sensor actually receives and analyzes the contiguous droplet edges present within an image of sampling area 48 on window 19, rather than merely receiving a pulse of light reflecting or emitting from an object on window 19.

Control 40 may be used to control windshield wipers 22 on front window 19 and may further be used to control rear window wipers 26 on rear window 20 of the vehicle 18. Control 40 may turn on rear wiper 26 at the same or different rate as front wipers 22. For example, for every N wipes of front wiper 32, control 40 may generate a command for rear wiper 26 to wipe one time. N is preferably some number greater than 1 so that rear wiper 26 does not wipe as often as front wiper 22. Control 40 may further vary the rate of rear wiper 26 based on the wipe rate of front wipers 22, which may also be varied depending on the level of precipitation detected on exterior surface 24 of window 19. Furthermore, the edge detection function may provide various thresholds at which control 40 activates the wipers at different speeds. For example, when the size and/or number of contiguous edges is low, the wipers may be activated for only a single wipe across the windshield or rear window, whereas when the size and/or number of the contiguous edges increases, a continuous low speed wipe may be provided or even a continuous high speed wipe as the size and/or number of contiguous edges detected further increases.

Figure 2B:
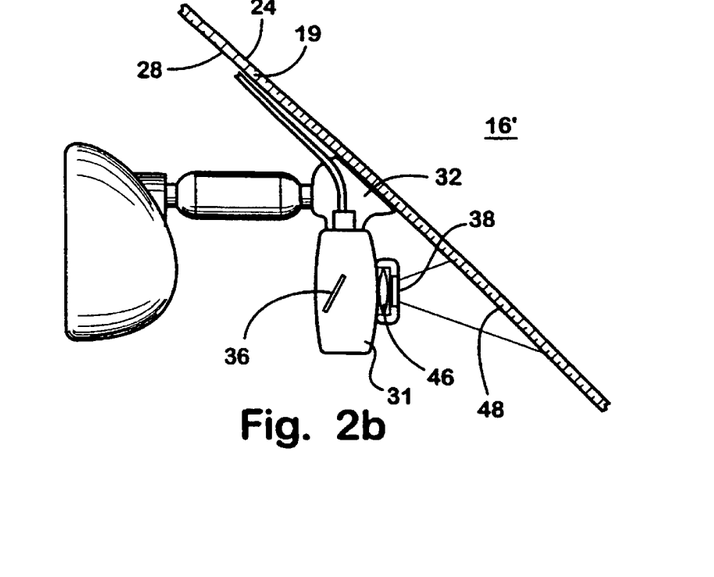
FIG. 2b is the same view as FIG. 2a of an alternate embodiment of the present invention.

In an alternate embodiment of a vehicle rain sensor system 16', illustrated in FIG. 2b, an illumination source 38 is also positioned within pod 31 to provide illumination to sampling area 48 of window 19. This allows illumination detector 36 to operate in low ambient light conditions by illuminating raindrops present on the window. When precipitation of fog is present on window 19, illumination emitting from illumination source 38 is reflected and refracted by the window and the precipitation droplets such that illumination is received by illumination detector 36. However, when neither fog nor rain is present on window 19, illumination detector 36 does not directly receive any substantial amount of light emitting from illumination source 38, as light emitting from illumination source 38 reflects downward from interior surface 28 of window 19 or refracts through window 19, rather than reflecting toward illumination detector 36.

Illumination source 38 may be a standard photodiode, infrared energy emitter or the like, and is preferably operable in a pulse mode. Most preferably, rain sensor 16' is coordinated such that illumination source 38 is pulsed to illuminate the area on the window while illumination detector is simultaneously exposed to the area. Illumination detector 36 may be either mechanically or electronically shuttered open at the precise moment that illumination source 38 is pulsed or activated. This results in a more efficient system by avoiding the operation of illumination source 38 except for those moments when illumination sensor 36 is actually receiving an image. This also allows a high peak illumination, as provided by illumination source 38, to be more readily extracted from the background ambient lighting. Because an imaging array sensor may process either visible light or invisible, infrared ranges, illumination source 38 of the present invention may provide illumination at a preferred wavelength which is between the visible ranges and infrared ranges. Therefore, illumination source 38 is preferably a LED which emits energy pulses having a wavelength near that of infrared light, such that the beam emitted is substantially invisible to the human eye, yet may still pass through the infrared filter characteristics within certain vehicle's windows. Most preferably, the energy emitted by illumination source 38 has a wavelength within the range of approximately 820 to 880 nanometers, which may be transmitted through the filtering characteristics of a window and processed by imaging array sensor 36.

Figure 6:
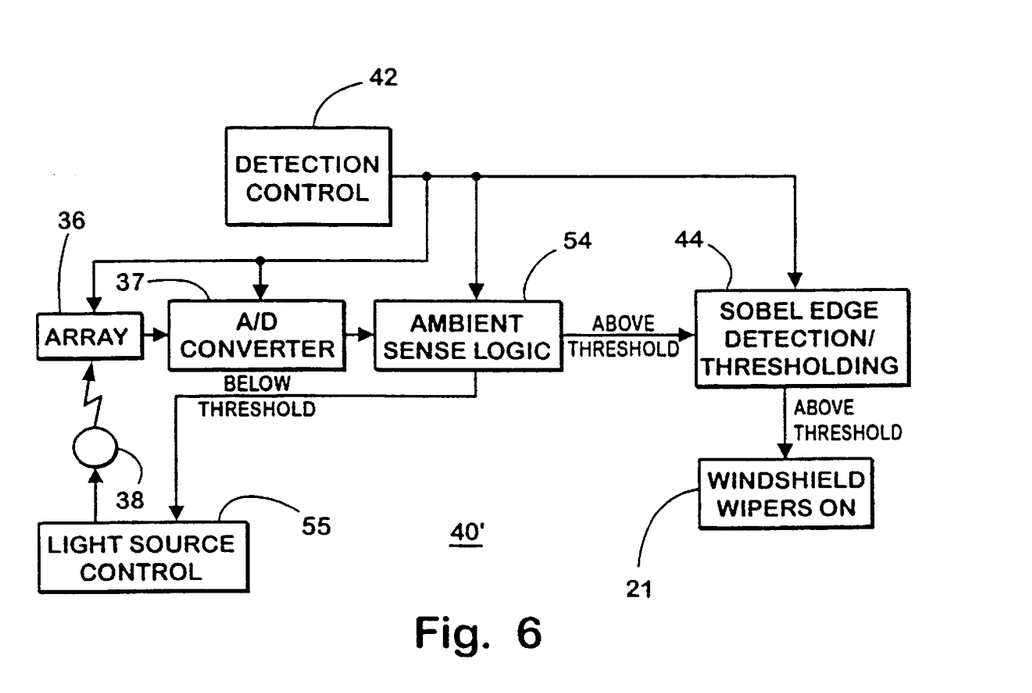
FIG. 6 is the same view as FIG. 4 of an alternate embodiment thereof.

A control 40' useful with rain sensor system 16' includes an ambient light logic function 54 to determine the level of ambient light present on window 19 and switch rain sensor system 16' between a passive mode, where illumination source 38 is not used, when light present on window 19 is provided by ambient light, and an active mode, where illumination source 38 is activated by an illumination source control 55, and patterns are illuminated on windshield 19 by illumination source 38 and received by imaging array 36 (FIG. 6). Preferably, illumination source control 55 activates illumination source 38 when the illumination level detected by ambient light logic function 54 is below a threshold value of approximately 250 lux. More preferably, the active mode is triggered when the illumination level detected is below approximately 150 lux, and most preferably, when the illumination level detected is below approximately 100 lux. Alternatively, illumination source control 55 may activate illumination source 38 in response to a signal from a head lamp controller to activate the headlights of the vehicle, or in response to the headlights being otherwise activated.

Most preferably, ambient light logic function 54 is responsive to the output of A/D converter 37 to determine ambient conditions from a light level sensed by imaging array sensor 36. More particularly, present ambient light conditions may be determined by summing the signal values received by each pixel within the imaging array sensor. When the sum of the values is above a predetermined threshold value, rain sensor system 16' operates in its passive mode and edge detection algorithm 44 analyzes the image as discussed above, while if the sum is below the predetermined threshold value, rain sensor system 16' instead operates in its active mode where ambient logic function 54 causes illumination source control 55 to activate illumination source 38. When in the active mode, illumination source 38 may be turned on in a pulse mode, so that illumination detector 36 receives several images to extract the signal from any noise that may be present. Once the noise has been removed from the signal, control function 42 determines if the level of precipitation, if any, is above a predetermined threshold value. If rain is detected, wiper control 21 activates front wipers 22, and may also operate rear wiper 26, as necessary.

Figure 5A:
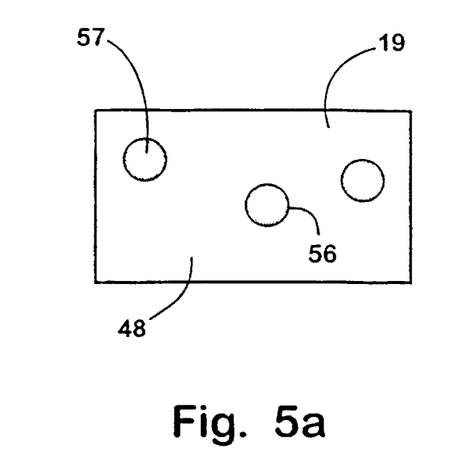
FIG. 5a is an enlarged illustration of the optical features of rain droplets which are detected by an edge detection algorithm during daytime conditions.
Figure 5B:
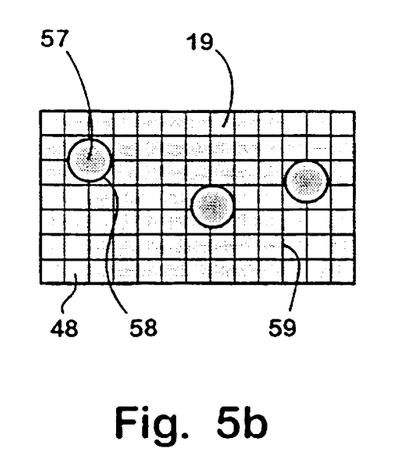
FIG. 5b is the same view as FIG. 5a during nighttime conditions.

Typical raindrops, as received by an imaging array sensor, are shown at 57 in FIGS. 5a and 5b. FIG. 5a shows an image of rain drops 57 on windshield 19 during daytime light conditions, when the system 16' may be in a passive mode. FIG. 5b shows images of typical raindrops 57 on window 19 when the system 16' is in an active mode at night lighting conditions. When precipitation droplets 57, such as from rain, dew or the like, are present on exterior surface 24 of window 19 in area 48 during the daytime, the light received by illumination detector 36 includes dark rings 56, which correspond to the edges of the precipitation droplets 57 present on window 19, as best shown in FIG. 5a. Conversely, when rain sensor 16' is in an active mode at nighttime, the edges of precipitation droplets 57 form images of light rings 58 on a dark background 59, as shown in FIG. 5b. The edge detection function 44 in control 40' functions to detect and analyze rings 56 and 58 and further determines a density of raindrops on area 48 of window 19. In both light conditions, the same edge detection algorithm may be applied to detect the edges and count the number of rain drops present on window 19, and compare that amount to a predetermined threshold value. Once the number of rings 56 and 58 that are detected is above a predetermined threshold value, control 40' operates to activate windshield wipers 22, including modulating wiper speed as a function of raindrop density sensed. Preferably, the threshold value may be changed as the level of ambient light changes, as the driver of a vehicle becomes more sensitive to raindrops on the windshield as ambient conditions get darker. Therefore, the algorithm may have a lower threshold value during night-time conditions than during daytime conditions. The threshold value may change as rain sensor system 16' is switched between its active and passive modes.

Figure 7:
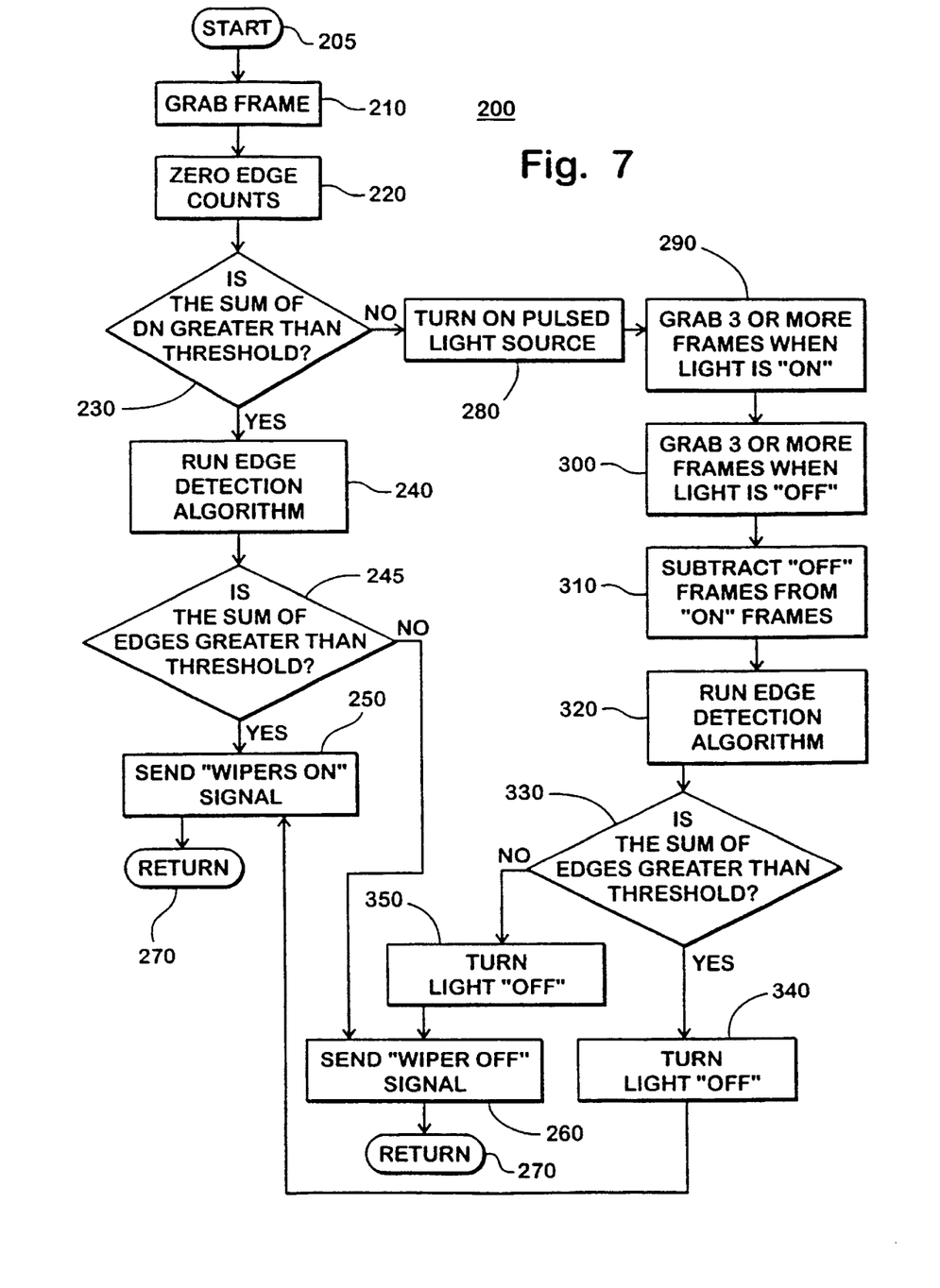
FIG. 7 is a flow chart of and edge detection process performed by the control circuit shown in FIG. 6.

Referring now to FIG. 7, a flow chart of a control process 200 of rain sensor system 16' begins at 205 by first grabbing an image at 210 received by imaging array sensor and resetting the number of edge counts by edge detection function to zero at 220. The sum of the light values sensed by the pixel in imaging array sensor is then determined and compared to a threshold value at 230. If it is determined at 230 that the sum is greater than the threshold value, then the edge detection function is activated at 240. The edges detected are then analyzed at 245 to determine if the number and/or size of the edges detected is greater than a threshold value. If it is determined at 245 that the number and/or size of the edges detected is greater than a threshold value, control process 200 functions to activate the wipers at 250. If the edges detected are less than the threshold value a "wiper off" signal is sent at 260. After the control sends the appropriate signal, the system returns at 270 to its initial settings and resumes the sampling process at 205.

If it is determined at 230 that the sum of the light values sensed by imaging array sensor are less than the threshold values, ambient sense logic function 54 activates or pulses an illumination source at 280. When the illumination source is pulsed, three more images are simultaneously taken at 290 by imaging array sensor, while three additional images are grabbed between the pulses or when the illumination source is otherwise off at 300. The control process then subtracts the data collected during the "off" frames from the data collected during the "on" frames at 310 to remove any noise from the signals. Once the noise has been removed, the edge detection function 44 is activated at 320 and the number and/or size of the edges detected are compared to a threshold value at 330. If it is determined at 330 that the number and/or size of the edges are greater than the threshold value, the illumination source is deactivated at 340 and a signal is communicated to activate the wipers at 250 at an appropriate speed. On the other hand, if the number of edges detected is less than the threshold value, the illumination source is deactivated at 350 and a "wiper off" signal is communicated at 260. Once either signal is communicated to the wipers, the system 16' again returns at 270 to its initial settings and resumes the sampling process at 205.

In an alternate embodiment, a rain sensor system 120 further includes a polarizing filter 62. This may allow rain sensor system 120 to discern between rain 57 and fog 66 on window 19, such that control function 42 may activate either wipers 22 or blower 60 when necessary, as discussed below. Polarizing filter 62 is positioned along an optic path 64 between illumination source 38 and illumination detector 36, and may be located between illumination source 38 and window 19 or between illumination detector 36 and window 19. By including a polarizing filter 62 according to the present invention, illumination detector 36 may be an inexpensive single element photo-sensor or the like, while still enabling rain sensor system 120 to detect and discriminate between fog and rain on window 19, thereby achieving optimal performance of the system at a potentially lower cost than a multi-element imaging array sensor.

Figures 8A, 8B, 8C:
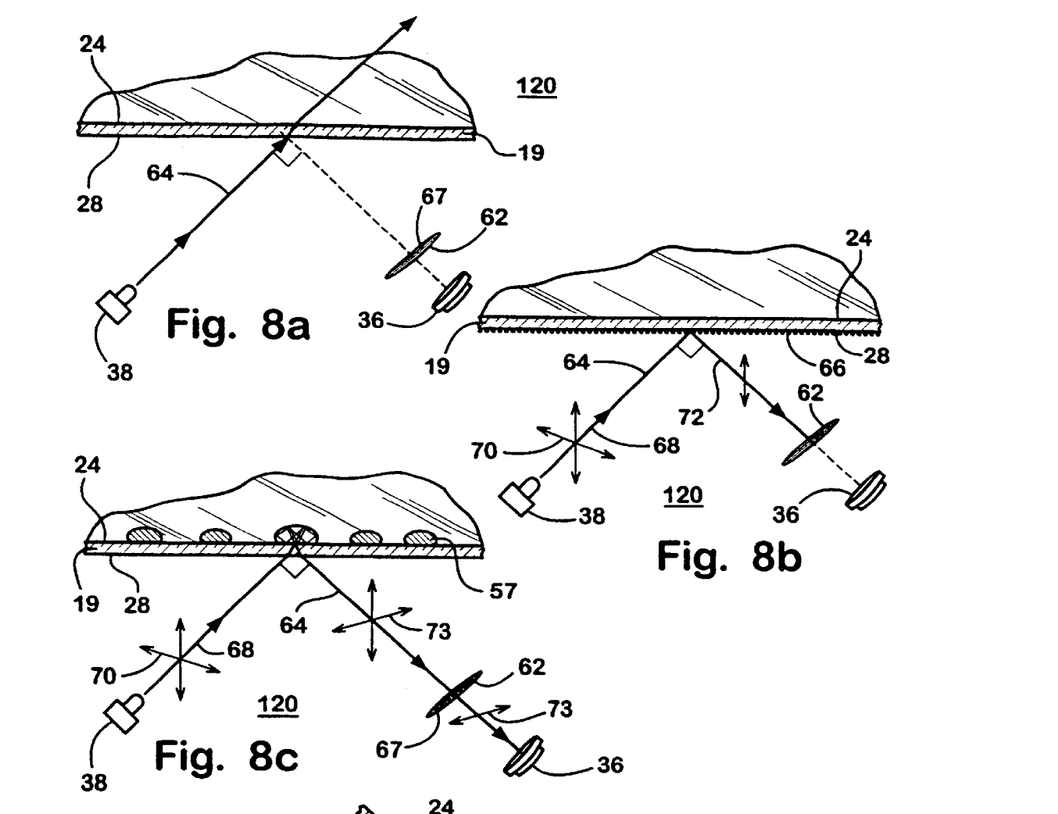
FIGS. 8a-c are graphic representations of side elevations of an alternative embodiment of a rain sensor with fog discrimination, illustrating operation thereof under different environmental conditions.

Referring now to FIGS. 8a, 8b and 8c, illumination source 38, illumination detector 36 and polarizing filter 62 are shown unattached to any base or bracket for clarity only, and are preferably mounted within a rear view mirror bracket or the like, as discussed above. Polarizing filter 62 is shown positioned between window 19 and illumination detector 36 and substantially reduces light that is oppositely polarized from a pass axis 67 within polarizing filter 62. When there is neither precipitation droplets present on exterior surface 24 of window 19 nor fog particles present on interior surface 28 of window 19, as illustrated in FIG. 8a, illumination detector 36 does not directly receive any substantial amount of light emitting from illumination source 38. This is due to the angle of window 19 relative illumination source 38 and detector 36, as light emitting from source 38 reflects downward from interior surface 28 of window 19 or refracts through window 19. However, as precipitation droplets become present on window 19 or fog particles 66 accumulate on interior surface 28 of window 19, light that radiates from illumination source 38 is directed toward illumination detector 36 as it either scatters and reflects due to rain droplets 57 on exterior surface 24 or is reemitted by a particle of fog 66 on interior surface 28 of window 19.

As illustrated in FIG. 8b, polarizing filter 62 substantially reduces light radiating from fog particle 66 that is received by illumination sensor 36. This is possible due to the fact that for most media, light is a transverse electromagnetic field, such that a non-polarized light ray, represented by line 68, has electromagnetic fields, generally represented by arrows 70, in all directions perpendicular to the direction that the light wave is traveling. Therefore, in order for light to propagate in any direction, the electromagnetic field coincident with the light ray must oscillate perpendicular to the direction of travel. When incident unpolarized light 68 is absorbed by a small enough particle, such as a particle of fog 66 or the like, the electrons of the particle vibrate in the directions of electromagnetic fields 70 present in the incident unpolarized light 68. The intensity of the light radiating from a small particle when illuminated by polarized light varies according to the equation:

$$I(\theta) = \frac{\rho_o^2 \omega^4 \sin^2\theta}{32\pi^2 c^3 \varepsilon_o r^2}; \text{ where } \omega = \frac{2\pi c}{\lambda};$$

where $\rho o$ is the dipole moment, $\omega$ is the angular frequency of light, $\lambda$ is the wavelength of light, c is the speed of light, $\varepsilon o$ is the permittivity of free space, r is the distance that the light is from the dipole, and $\theta$ is the angle of the radiated light relative to the direction of oscillation of the electrons in the particle. For non-polarized light striking a small particle, the overall intensity of the light radiated from the particle is a linear superposition of the intensities from each electromagnetic field oscillating within the incident light. As the light is radiated in a direction perpendicular to the incident ray of light, $\theta$ is approximately zero relative to the electrons oscillating along one of the electromagnetic fields, which results in a substantially zero intensity of light in that direction that is supported by that particular electromagnetic field. On the other hand, $\theta$ is simultaneously approximately 90 degrees relative to the direction of oscillation of electrons oscillating along another of the electromagnetic fields, which results in the light supported by the second electromagnetic field being at its greatest intensity. Therefore, the superposition of these intensities results in a light ray 72 re-emitting from a fog particle 66 that is substantially linearly polarized light when the emitted light propagates at approximately 90 degrees relative to the direction of the incident light, as the other directions of oscillation either were not present in the incident unpolarized light 68 or otherwise cannot support propagation of the light. However, as the size of the particle increases, such as to the size of a rain droplet, the polarization effect goes away. Therefore, while light re-emitting from a fog particle is substantially linearly polarized, light reflecting and scattering from a precipitation droplet is primarily non-polarized.

Preferably, illumination source 38 and illumination detector 36 are oriented relative one another at approximately an 80 to 100 degree angle at interior surface 28 of window 19. Most preferably, this angle is approximately 90 degrees. Polarizing filter 62 may be placed between window 19 and illumination detector 36 such that its pass axis 67 is perpendicular to an electromagnetic field present in the linear polarized light 72 emitting from the fog particle 66. As shown in FIG. 8b, for example, with illumination detector 36 and source 38 being oriented substantially horizontally, the polarized light 72 emitting from fog particle 66 toward illumination detector 36 is substantially vertically polarized. By orienting the pass axis 67 of polarizing filter 62 substantially horizontally, there will be substantial filtering of the polarized light ray 72 before it is received by illumination detector 36. Therefore, when fog particles 66 are present on interior surface 28 of window 19, illumination detector 36 receives a very weak signal, similar to the signal received when there is neither rain nor fog present on the window, thereby substantially reducing any possibility of illumination detector 36 receiving a false signal of rain droplets when there is merely fog particles 66 present on interior surface 28 of window 19.

As shown in FIG. 8c, when a precipitation droplet 57 is present on exterior surface 24 of window 19, incident unpolarized light 68 refracts through window 19 and reflects within the water droplets 57, resulting in a scattering of light back toward interior surface 28 of window 19. The light is reflected and scattered in many directions such that a substantial amount of light may be received by illumination detector 36, thereby generating a signal that there is rain present on exterior surface 24 of window 19. The scattered light remains unpolarized and thus passes through polarizing filter 62, as polarizing filter 62 merely polarizes the light, thereby allowing light that has its electromagnetic fields (shown as a horizontal line 73) substantially similar to the pass axis 67 of polarizing filter 62 to pass therethrough. Therefore, illumination detector 36 still receives a stronger signal when there are precipitation particles 57 on exterior surface 24 of window 19 than when there is either fog particles 66 present on interior surface 28 of window 19 or when there is neither fog nor rain present on window 19. After illumination detector 36 receives the polarized light ray as polarized by polarizing filter 62, control function 42 again functions to analyze the signal received and determine whether wipers 22 and 26 should be activated, as discussed above.

Alternately, polarizing filter 62 may be movably positioned in optic path 64, to allow illumination detector 36 to receive a signal alternating from polarized to non-polarized light by occasionally positioning polarizing filter 62 in optic path 64. This allows rain sensor system 120 to further discern between when fog is present, when rain is present, when both rain and fog are present, and when neither rain nor fog is present. The difference between the polarized and non-polarized signals received by illumination detector 36 is greater when fog is present on the window, compared to the difference between the strong signals received when rain alone is present on window 19. When fog is detected by control function 42, the intensity of each signal is measured to further determine if rain is also present on exterior surface 24. Subsequently, control 40' may further communicate with blower 60 within vehicle 18 to operate blower 60 and eliminate the fog on the interior surface of window 19 when a threshold value of fog is detected, while also activating wipers 22 if necessary. When weak signals are received both when the polarizer is present and when not present, neither rain nor fog is present on window 19.

Figure 9:
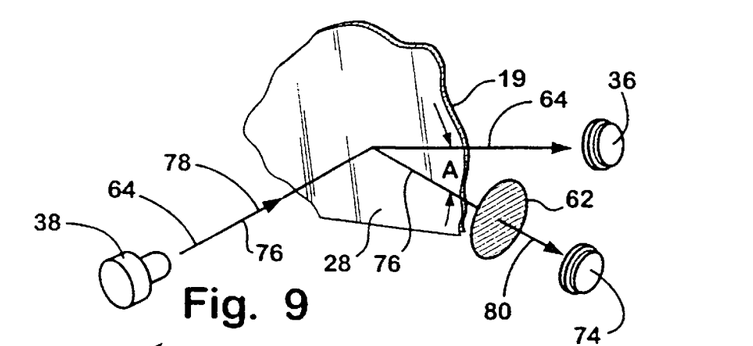
FIG. 9 is a perspective view of another alternate embodiment of a rain sensor with fog discrimination in the direction of the window interior surface.
Figure 10A:
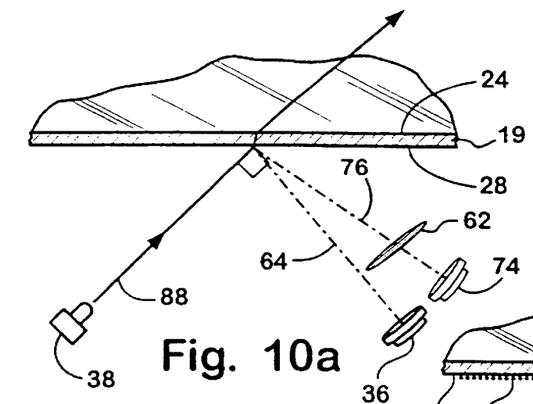
FIGS. 10a-c are side elevations of the embodiment illustration in FIG. 9 illustrating operation thereof under different conditions.
Figure 10B:
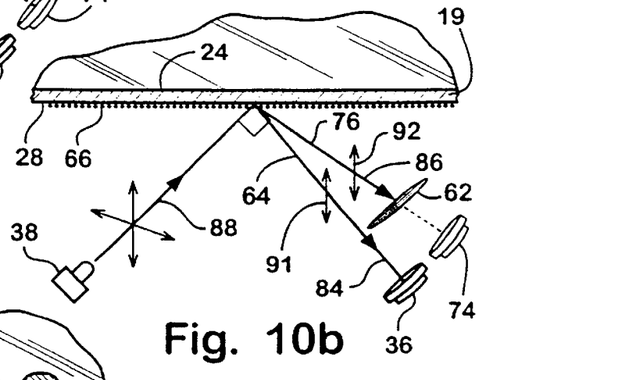
Figure 10C:
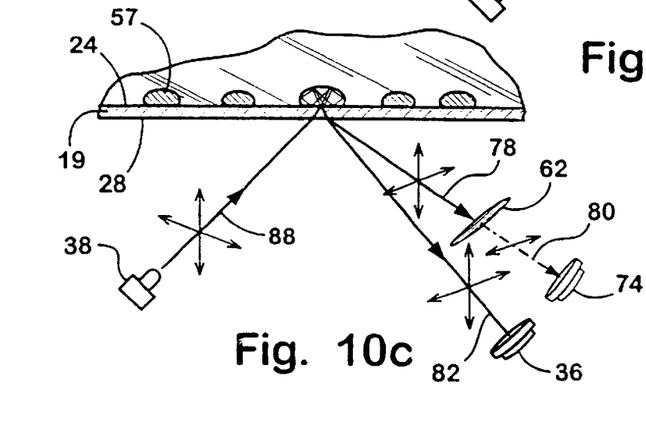

In an alternate embodiment, as shown in FIGS. 9 and 10, a rain sensor system 130 further includes a second illumination detector 74 which defines a second optic path 76 between illumination source 38 and second detector 74 via window 19. A polarizing filter 62 may be positioned at any point along one or the other of the two optic paths 64 and 76. As shown in FIG. 9, polarizing filter 62 may be positioned between illumination detector 74 and window 19. Because polarizing filter 62 is positioned along optic path 76, illumination source 38 and second illumination detector 74 are preferably oriented relative one another at approximately an 80 to 100 degree angle at interior surface 28 of window 19, and most preferably at approximately a 90 degree angle. Illumination detector 36 may then be positioned substantially adjacent detector 74, preferably with an angle A between detectors 36 and 74 being minimized to be as close to zero degrees as possible, such that both detectors receive substantially the same light signal from window 19. When neither fog nor rain is present on window 19, as shown in FIG. 10a, neither first illumination detector 36 nor second illumination detector 74 receives a strong signal directly from illumination source 38. However, when rain is present on window 19, polarizing filter 62 polarizes a light ray 78 from illumination source 38 along optic path 76, such that a polarized light ray 80, which is received by illumination detector 74, is linearly polarized in one direction only, such as in the horizontal direction shown in FIG. 10c. A non-polarized light ray 82 is simultaneously received by first illumination detector 36. Therefore, when rain drops or other precipitation droplets are present on exterior surface 24 of window 19, both illumination detectors 36 and 74 will receive a signal as the non-polarized light rays 78 and 82 are reflected, refracted and scattered by the droplets present on window 19, such that a substantial portion of the scattered light is directed toward both illumination detectors 36 and 74. Because light ray 78 is not polarized when it reaches polarizing filter 62, polarizing filter 62 merely polarizes the light, which still allows polarized light ray 80 to be received by illumination detector 74.

When fog particles 66 alone are present on interior surface 28 of window 19, as shown in FIG. 10b, a polarized light ray 86 from fog particle 66 is emitted only in directions perpendicular to an incident ray of light 88 from illumination source 38. As discussed above, the orientation of illumination detector 74 relative to illumination source 38 is preferably at approximately a 90 degree angle along optic path 76, such that polarized light ray 86 is directed toward illumination detector 74. Therefore, polarizing filter 62, with its pass axis 67 oriented in a direction perpendicular to the electromagnetic field 92 in polarized light ray 86, functions to substantially filter out polarized light ray 86 so that substantially no signal is received by illumination detector 74 when fog is present on interior surface 28 of window 19. Conversely, illumination detector 36 simultaneously receives a non-filtered light ray 84 when fog is present on window 19. Light ray 84 may also be substantially polarized if illumination detector 36 is also oriented relative to illumination source 38 at approximately a 90 degree angle at window 19.

Because illumination detectors 36 and 74 receive different signals when fog is present, when rain is present, when both rain and fog are present and when neither rain nor fog is present on window 19, control function 42 may analyze the signals received by both illumination detectors 36 and 74 to determine if either fog is present on interior surface 28 or precipitation is present on exterior surface 24 of window 19 or both fog and precipitation are present. If the signal received by illumination detector 36 is approximately equal to twice the signal received by second illumination detector 74, then no fog is present, as non-polarized light passes through polarizing filter 62 and is received by illumination detector 74. Control function 42 then measures the intensity of the signals to determine if rain is present, as rain results in a greater intensity in the signal received due to scattering of light from rain droplet 57. On the other hand, if a signal is received by illumination detector 74, yet the signal received by illumination detector 36 is substantially greater than twice the signal received by second illumination detector 74, then control function 42 may conclude that fog is present on interior surface 28 of window 19, and activate blower 60 to defog the interior surface 28 of window 19. If fog is detected, control function 42 further measures and compares the intensities of the signals to determine if rain is also present on exterior surface 24. Illumination detectors 36 and 74 may either be single element photo-sensors or multi-element imaging arrays, both of which are capable of receiving the different signals reflecting or emitting from objects on window 19.

Figures 11, 12:
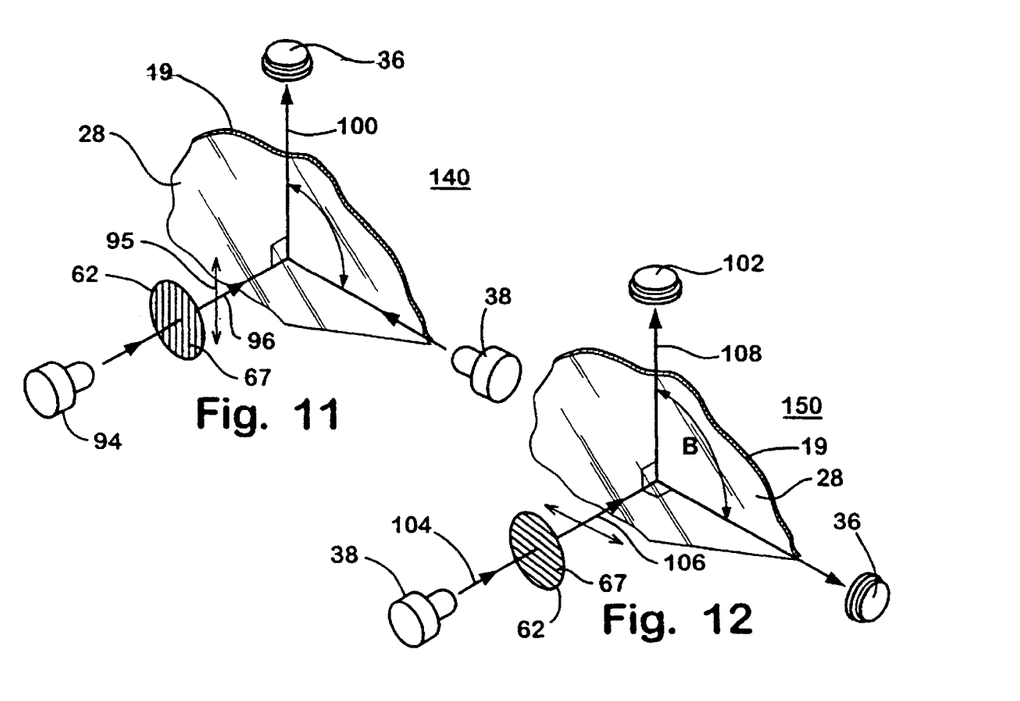
FIG. 11 is the same view as FIG. 9 of another alternate embodiment thereof.
FIG. 12 is the same view as FIG. 9 of yet another alternate embodiment thereof.

Another alternate embodiment of the present invention is shown in FIG. 11, where a rain sensor system 140 includes two illumination sources 38 and 94, one illumination detector 36 and a polarizing filter 62. In this embodiment, polarizing filter 62 may be positioned between illumination source 94 and window 19, such that illumination detector 36 receives light from a polarized source 94 and an unpolarized source 38. Illumination sources 38 and 94 are cycled alternately such that illumination detector 36 and control function 42 may determine which illumination source 38 or 94 the signal is being received from. The orientation of polarized source 94 and illumination detector 36 is preferably within a range of approximately 80 to 100 degrees relative one another, and most preferably approximately 90 degrees relative one another. This embodiment functions similar to those described above, in that when there is neither rain nor fog present on window 19, illumination detector 36 receives substantially no signal from both illumination sources 38 and 94. However, when small fog particles are present on interior surface 28 of window 19, a polarized beam or ray 96, having an electromagnetic field 95 in a single direction which is substantially perpendicular to light ray 96, passes through linear polarizer 62 and is absorbed and re-emitted by the particles. According to the light intensity equation for $I(\theta)$ discussed above, when linearly polarized light strikes a fog particle, the intensity of light re-emitted will be approximately zero in a direction that is both along the direction of the electromagnetic field 95 present in the polarized ray of light and perpendicular to the incident ray of light, as the angle $\theta$ will be zero in that direction. By positioning illumination detector 36 along a path in this direction, illumination detector 36 receives substantially no signal from polarized illumination source 94 when fog is present on the interior surface 28 of window 19, yet still receives a strong signal from unpolarized illumination source 38. On the other hand, if rain alone is present on window 19, illumination detector 36 receives a strong signal from illumination source 38 and approximately a one-half signal from illumination source 94. Furthermore, if both fog and rain are present on window 19, illumination detector 36 again receives a strong signal from illumination source 38, but receives a signal from illumination source 94 that is greater than the approximately zero intensity signal received when fog alone is present, but less than the approximately one-half signal received when rain alone is present on window 19. Control function 42 compares the signals received from each illumination source 38 and 94 to determine if fog, rain, both fog and rain or neither fog nor rain is present on window 19, and correspondingly activate or deactivate the appropriate device. Illumination detector 36 of rain sensor system 140 is preferably an imaging array sensor, but may alternatively be a single element photosensor or the like.

Still yet another embodiment of the present invention is shown in FIG. 12, where a rain sensor system 150 includes a single illumination source 38 and two illumination detectors 36 and 102. A polarizing filter 62 is positioned between illumination source 38 and window 19, such that a light ray 104 from illumination source 38 is polarized to become a polarized light ray 106 before reflecting or emitting from window 19. Both detectors 36 and 102 are preferably oriented within a range of approximately 80 to 100 degrees relative one another, as represented by an angle B in FIG. 12, and further oriented within a range of approximately 80 to 100 degrees relative polarized illumination source 38. Most preferably, illumination detectors 36 and 102 and illumination source 38 are oriented at approximately 90 degrees relative one another. Polarizing filter 62 has little effect on rain sensor system 150 when rain is present on window 19 or when neither rain nor fog is present on window 19. However, when fog particles 66 are present on interior surface 28 of window 19, polarized light ray 106 is absorbed by fog particles 66 and is re-emitted with a minimal or substantially zero intensity in a direction parallel to the electromagnetic field that was present in polarized light ray 106. Therefore, by polarizing the light in the horizontal direction, as shown in FIG. 12, light in a vertical direction, or perpendicular to the pass axis 67 or polarized electromagnetic field, is emitted by the small particle of fog 66 with a much greater intensity than the light propagating parallel to the electromagnetic field. This results in second illumination detector 102 receiving polarized light 108 re-emitted from a fog particle, while first illumination detector 36 receives substantially no signal when fog is present on the interior surface of window 19. If the signal received by illumination detector 36 is approximately the same as the signal received by second illumination detector 102, then control function 42 may conclude that no fog is present on interior surface 28 of window 19. The intensity of the signals are then analyzed and compared to determine if rain alone is present on window 19. However, if the signal received by second illumination detector 102 is substantially greater than the signal received by illumination detector 36, then fog is present on interior surface 28 of window 19, and control function 42 may subsequently operate the blower to eliminate the fog and further compare the intensities of the signals received to determine if rain is also present on window 19.

Figure 13:
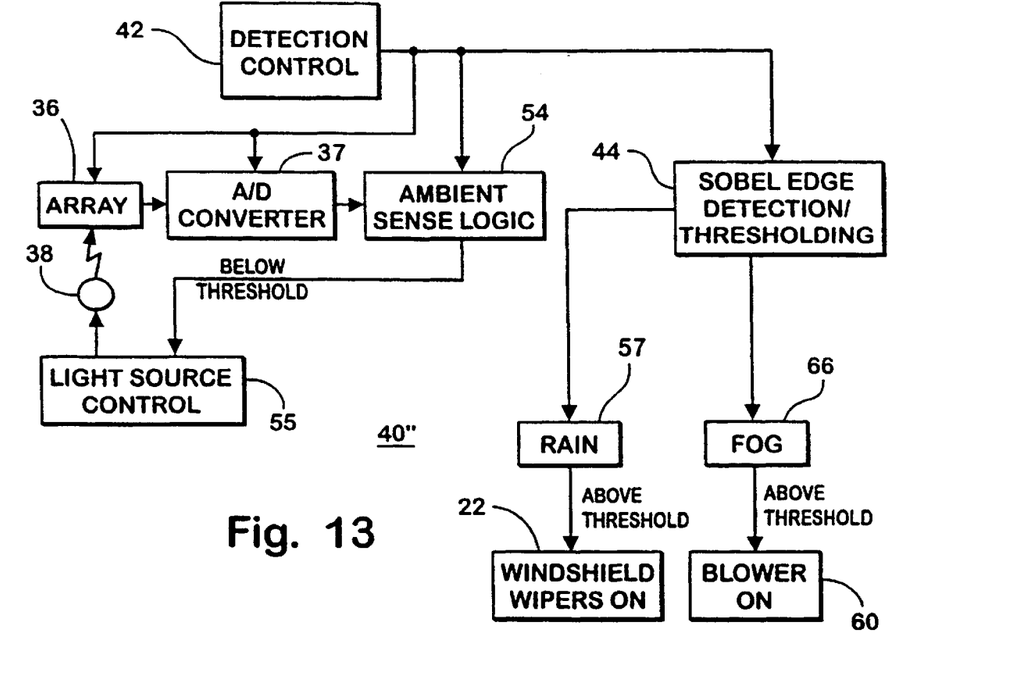
FIG. 13 is the same view as FIG. 4 of another alternate embodiment thereof.

Referring now to FIG. 13, an alternate embodiment of a rain sensor system 160 is diagrammed. Rain sensor system includes at least one illumination source 38, at least one illumination sensor 36 and a polarizing filter (not shown). A control 40" useful with rain sensor system 160 includes an ambient light logic function 54 to determine the intensity of ambient light and switch rain sensor system 160 between active and passive modes, as discussed above. Most preferably, ambient logic function 54 responds to the output of A/D converter 37 to determine ambient conditions as sensed by at least one of the imaging array sensors and further communicates with illumination source control 55 if ambient light is below a threshold value. Illumination source control 55 activates at least one of the illumination sources 38 so that light may be received by imaging array sensors 36. The polarizing filter is positioned along at least one optic path between the illumination sources and the illumination sensors so as to filter or polarize light before it is received by at least one of the sensors, similar to the embodiments discussed above. Edge detection function 44 then analyzes the signal or signals received by the illumination sensor or sensors to determine if there is rain alone, fog alone, both rain and fog, or neither rain nor fog present on window 19.

If rain is detected, edge detection function 44 determines if the amount of rain is above a threshold value, while if fog is detected, the control 40" further analyzes the signals to determine if the level of fog is above a threshold value. Accordingly, either wipers 22, blower 60 or both are activated by control 40", if necessary.

While several alternate embodiments have been depicted and described above, clearly the present invention may include other variations where there are one or two illumination sources and detectors, with at least one polarizing filter positioned along an optic path defined by one of the illumination detectors and one of the illumination sources via window 19, without affecting the scope of the present invention. Polarizing filter 62 may be positioned between an illumination source and window 19 or between an illumination detector and window 19, and may be oriented such that its pass axis 67 allows linearly polarized light to pass therethrough in such a fashion as to allow the rain sensor system to discern between unpolarized light being scattered from rain drops 40 on exterior surface 24 of window 19 and linearly polarized light being emitted from a particle of 66 on interior surface 28 of window 19. Most preferably, in order to optimize the rain sensor system so as to best determine when fog is present on interior surface 28 of window 19, at least one set of illumination sources and sensors is preferably oriented such that the optical path to the corresponding sensor or source is at approximately a 90 degree angle between the source and sensor at the interior surface 28 of window 19. This orientation best allows the system to determine when small particles of fog are present, while not inadvertently concluding that fog is present when rain is actually present on exterior surface 24.

The concepts of the present invention may be used in association with rain sensor interior mirror assemblies wherein a rain sensor functionality is provided in association with an interior rearview mirror assembly. Such association includes utilizing an element of the rearview mirror assembly (such as a plastic housing attached, for example, to the mirror channel mount that conventionally attaches the mirror assembly to a windshield button slug) to cover a windshield-contacting rain sensor. The rearview mirror assembly can include a display function (or multiple display functions).

These displays may perform a single display function or multiple display functions such as providing indication of an additional vehicle function, such as a compass mirror display function, a temperature display functions, status of inflation of tires display function, a passenger air bag disable display function, an automatic rain sensor operation display function, telephone dial information display function, highway status information display function, blind spot indicator display function, or the like. such display may be an alphanumerical display or a multi-pixel display, and may be fixed or scrolling. Such an automatic rain sensor operation display function may include a display function related to a both a windshield-contacting and a non-windshield-contacting rain sensor, including, for example, where the circuitry to control the rain sensor, electrochromic dimming of a variable reflectance electrochromic mirror, and any other mirror-mounted electronic feature are commonly housed in or on a rearview mirror assembly and wholly or partially share components on a common circuit board. The blind spot detection display or the automatic rain sensor operation display may alternate with other display functions by a display toggle which may be manually operated, time-shared, voice-actuated, or under the control of some other sensed function, such as a change in direction of the vehicle or the like. should a rain sensor control be associated with, incorporated in, or coupled to the interior rearview mirror assembly, the rain sensor circuitry, in addition to providing automatic or semi-automatic control over operation of the windshield wipers (on the front and/or rear windshield of the vehicle), can control the defogger function to defog condensed vapor on an inner cabin surface of a vehicle glazing (such as the inside surface of the front windshield, such as by operating a blower fan, heater function, air conditioning function, or the like), or the rain sensor control can close a sunroof or any other movable glazing should rain conditions be detected. As stated above, it may be advantageous for the rain sensor control (or any other feature such as a head-lamp controller, a remote keyless entry receiver, a cellular phone including its microphone, a digital voice recorder, a video camera for a video phone, a taxi meter and/or taxi meter display, a vehicle status indicator and the like) to share components and circuitry with the electrochromic mirror function control circuitry and electrochromic mirror assembly itself. Also, a convenient way to mount a non-windshield-contacting rain sensor such as described herein is by attachment, such as by snap-on attachment, as a module to the mirror channel mount such as is described in U.S. Pat. No. 5,576,678 entitled "Mirror Support Bracket," invented by R. Hook et al. and issued Nov. 19, 1996, the disclosure of which is hereby incorporated by reference herein. The mirror mount and/or windshield button may optionally be specially adapted to accommodate a non-windshield-mounting rain sensor module. Such mounting as a module is readily serviceable and attachable to a wide variety of interior mirror assemblies (both electrochromic and non-electrochromic such as prismatic, manually adjusted mirror assemblies), and can help ensure appropriate alignment of the non-windshield-mounted variety of rain sensor to the vehicle windshield insofar that the module attached to the mirror mount remains fixed whereas the mirror itself (which typically attaches to the mirror channel mount via a single or double ball joint) is movable so that the driver can adjust its field of view. Also, should smoke from cigarettes and the like be a potential source of interference to the operation of the non-windshield-contacting rain sensor, then a mirror-attached housing can be used to shroud the rain sensor unit and shield it from smoke (and other debris). Optionally, such ability to detect presence of cigarette smoke can be used to enforce a non-smoking ban in vehicles, such as is commonly requested by rental car fleet operators. Also, when a rain sensor (contacting or non-contacting) is used to activate the wiper on the rear window (rear backlight) of the vehicle, the sensor can be conveniently packaged and mounted with the CHMSL (center high mounted stop light) stop light assembly commonly mounted on the rear window glass or close to it. Mounting of the rain sensor with the CHMSL stoplight can be aesthetically appealing and allow sharing of components/wiring/circuitry.

The concepts of this present invention can be used with interior rearview mirrors equipped with a variety of features such as a high/low (or daylight running beam/low) headlamp controller, a hands-free phone attachment, a video camera for internal cabin surveillance and/or video telephone function, seat occupancy detection, map reading lights, compass/temperature display, taxi meter display, fuel level and other vehicle status display, a trip computer, an intrusion detector and the like. Again, such features can share components and circuitry with the electrochromic mirror circuitry and assembly so that provision of these extra features is economical.

Placement of a video camera either at, within, or on the interior rearview mirror assembly (including within or on a module attached to a mirror structure such as the mount that attaches to the windshield button) has numerous advantages. For example, the mirror is centrally and high mounted and the camera can be unobtrusively mounted.

Therefore, a rain sensor is disclosed herein that provides an accurate method of detecting rain on a vehicle window by actually capturing an image of an area on the window and further determining when the amount of precipitation present on the window reaches a predetermined threshold value before activating the wiper system of the vehicle. The rain sensor may further detect both fog and rain on the window, and is able to discriminate therebetween. The rain sensor of the present invention is also decoupled from the window to avoid replacement concerns and the like that are present with many of the rain sensors in use today.

Furthermore, the rain sensor of the present invention provides optimal performance by detecting both fog and rain on the window, while providing a system that may implement standard, low cost single element photo-sensors and photodiodes or the like.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as followed:

1. A vehicular precipitation sensor which senses precipitation consisting of at least one of rain and fog on a vehicle window, said vehicular precipitation sensor comprising:
   an imaging array sensor directed at the vehicle window from inside the vehicle, said imaging array sensor comprising a plurality of pixels, said pixels sensing a light value of incident radiation, said imaging array sensor comprising one of a CMOS and a CCD sensor. said imaging array sensor being responsive at least to incident visible light, said imaging array sensor capturing images of precipitation on the window, said imaging array sensor generating an output indicative of said captured images; and
   a control operable to process said output to detect precipitation at a surface of the vehicle window in response to said output of said imaging array sensor, said control controlling an accessory of the vehicle in response to the precipitation detected reaching a threshold level of detected precipitation, said threshold level of detected precipitation being adjustable in response to at least a level of ambient visible light present at the window.

2. The vehicular precipitation sensor of claim 1, wherein said imaging array sensor is operable to detect precipitation which includes water droplets at an exterior surface of the vehicle window.

3. The vehicular precipitation sensor of claim 1, wherein said imaging array sensor is operable to detect precipitation which includes fog particles at an interior surface of the vehicle window.

4. The vehicular precipitation sensor of claim 1, wherein said imaging array sensor is operable to detect precipitation which includes water droplets at an exterior surface of the vehicle window and fog particles at an interior surface of the vehicle window.

5. The vehicular precipitation sensor of claim 1, wherein said accessory comprises a window wiper of the vehicle.

6. The vehicular precipitation sensor of claim 5, wherein said control is operable to control said window wiper of the vehicle in response to said imaging array sensor detecting precipitation at an exterior surface of the window.

7. The vehicular precipitation sensor of claim 6, wherein said control is operable to control a windshield wiper of the vehicle and a rear window wiper of the vehicle in response to said imaging array sensor detecting precipitation at the exterior surface of the window.

8. The vehicular precipitation sensor of claim 7, wherein said control causes the rear window wiper to cycle for every N cycles of the windshield wiper, wherein N is greater than one.

9. The vehicular precipitation sensor of claim 1, wherein said accessory comprises a movable window of the vehicle.

10. The vehicular precipitation sensor of claim 9, wherein said control is operable to control a movable window of the vehicle to close the movable window in response to said imaging array sensor detecting precipitation at an exterior surface of the window.

11. The vehicular precipitation sensor of claim 1, wherein said accessory comprises a defogging system of the vehicle.

12. The vehicular precipitation sensor of claim 11, wherein said control is operable to control a defogging system of the vehicle in response to said imaging array sensor detecting precipitation at an interior surface of the window.

13. The vehicular precipitation sensor of claim 1, including a polarizing filter positionable between the vehicle window and said imaging array sensor.

14. The vehicular precipitation sensor of claim 1, including an illumination device for illuminating the vehicle window in an area near said imaging array sensor.

15. The vehicular precipitation sensor of claim 14, wherein said illumination device provides illumination having an illumination wavelength approximately that of an infrared wavelength.

16. The vehicular precipitation sensor of claim 14, including an illumination device control for at least occasionally activating said illumination device.

17. The vehicular precipitation sensor of claim 16, wherein said illumination device is pulsed on and off by said illumination device control.

18. The vehicular precipitation sensor of claim 17, wherein during low light conditions, said imaging array sensor is exposed to the vehicle window when said illumination device is pulsed on and not exposed to the vehicle window when said illumination device is pulsed off.

19. The vehicular precipitation sensor of claim 17, wherein said illumination device is pulsed on and off at least two times.

20. The vehicular precipitation sensor of claim 19, wherein said output of said imaging array sensor includes noise, said control being operable to reduce said noise of said output of said image array sensor as a function of the pulsation of said illumination device.

21. The vehicular precipitation sensor of claim 16, wherein said illumination device control activates said illumination device during low light conditions.

22. The vehicular precipitation sensor of claim 16, wherein said illumination device control senses ambient light at the window.

23. The vehicular precipitation sensor of claim 22, wherein said illumination device control activates said illumination device in low ambient light conditions.

24. The vehicular precipitation sensor of claim 22, wherein said threshold level of detected precipitation is adjustable in response to said illumination device control.

25. The vehicular precipitation sensor of claim 1, wherein said threshold level of detected precipitation is decreased in response to a low level of ambient light at the vehicle window.

26. The vehicular precipitation sensor of claim 1, wherein said threshold level of detected precipitation is increased in response to a high level of ambient light at the vehicle window.

27. The vehicular precipitation sensor of claim 1, wherein said threshold level of detected precipitation comprises a first threshold value during night-time conditions and a second threshold value during day time conditions, said second threshold value being greater than said first threshold value.

28. The vehicular precipitation sensor of claim 1, wherein said imaging array sensor comprises a CMOS sensor.

29. A vehicular precipitation sensor which senses at least one of rain and fog on a vehicle window, said vehicular precipitation sensor comprising:

an imaging array sensor directed at the vehicle window from inside the vehicle, said imaging array sensor comprising a plurality of pixels, said pixels sensing a light value of incident radiation, said imaging array sensor being responsive at least to incident visible light, said imaging array sensor capturing images of precipitation on the window, said imaging array sensor generating an output indicative of said captured images;

an illumination device for providing illumination at least occasionally at the vehicle window, said illumination device being operable in a pulse mode to pulse said illumination device on and off at least two times; and a control operable to process said output to detect precipitation at a surface of the vehicle window in response to said output of said imaging array sensor, said output of said imaging array sensor including a signal indicative of precipitation at said surface of the vehicle window and said output of said imaging array sensor further including noise, said control being operable to reduce said noise of said output of said imaging array sensor as a function of said pulse mode of said illumination device, said control controlling an accessory of the vehicle in response to the precipitation detected.

30. The vehicular precipitation sensor of claim 29, wherein said imaging array sensor is operable to detect precipitation which includes water droplets at an exterior surface of the vehicle window.

31. The vehicular precipitation sensor of claim 29, wherein said imaging array sensor is operable to detect precipitation which includes fog particles at an interior surface of the vehicle window.

32. The vehicular precipitation sensor of claim 29, wherein said imaging array sensor is operable to detect precipitation which includes water droplets at an exterior surface of the vehicle window and fog particles at an interior surface of the vehicle window.

33. The vehicular precipitation sensor of claim 29, wherein said accessory comprises a window wiper of the vehicle.

34. The vehicular precipitation sensor of claim 33, wherein said control is operable to control said window wiper of the vehicle in response to said imaging array sensor detecting precipitation at an exterior surface of the window.

35. The vehicular precipitation sensor of claim 34, wherein said control is operable to control a windshield wiper of the vehicle and a rear window wiper of the vehicle in response to said imaging array sensor detecting precipitation at the exterior surface of the window.

36. The vehicular precipitation sensor of claim 35, wherein said control causes the rear window wiper to cycle for every N cycles of the windshield wiper, wherein N is greater than one.

37. The vehicular precipitation sensor of claim 29, wherein said accessory comprises a movable window of the vehicle.

38. The vehicular precipitation sensor of claim 37, wherein said control is operable to control a movable window of the vehicle to close the movable window in response to said imaging array sensor detecting precipitation at an exterior surface of the window.

39. The vehicular precipitation sensor of claim 29, wherein said accessory comprises a defogging system of the vehicle.

40. The vehicular precipitation sensor of claim 39, wherein said control is operable to control a defogging system of the vehicle in response to said imaging array sensor detecting precipitation at an interior surface of the window.

41. The vehicular precipitation sensor of claim 29, including a polarizing filter positionable between the vehicle window and said imaging array sensor.

42. The vehicular precipitation sensor of claim 29, wherein said illumination device provides illumination having an illumination wavelength approximately that of an infrared wavelength.

43. The vehicular precipitation sensor of claim 29, including an illumination device control for at least occasionally activating said illumination device.

44. The vehicular precipitation sensor of claim 43, wherein said illumination device is pulsed on and off by said illumination device control.

45. The vehicular precipitation sensor of claim 44, wherein during low light conditions, said imaging array sensor is exposed to the vehicle window when said illumination device is pulsed on and not exposed to the vehicle window when said illumination device is pulsed off.

46. The vehicular precipitation sensor of claim 43, wherein said illumination device control activates said illumination device during low light conditions.

47. The vehicular precipitation sensor of claim 43, wherein said illumination device control senses ambient light at the window.

48. The vehicular precipitation sensor of claim 47, wherein said illumination device control activates said illumination device in low ambient light conditions.

49. The vehicular precipitation sensor of claim 47, wherein said control is operable to control said accessory in response to a threshold level of detected precipitation at the vehicle window.

50. The vehicular precipitation sensor of claim 49, wherein said threshold level of detected precipitation is adjustable in response to said illumination device control.

51. The vehicular precipitation sensor of claim 50, wherein said threshold level of detected precipitation is decreased in response to a low level of ambient light at the vehicle window.

52. The vehicular precipitation sensor of claim 50, wherein said threshold level of detected precipitation is increased in response to a high level of ambient light at the vehicle window.

53. The vehicular precipitation sensor of claim 29, wherein said imaging array sensor comprises a CMOS sensor.

54. A vehicular precipitation sensor which senses precipitation consisting of at least one of rain and fog on a vehicle window, said vehicular precipitation sensor comprising:

an imaging array sensor directed at the vehicle window from inside the vehicle, said imaging array sensor comprising a plurality of pixels, said pixels sensing a light value of incident radiation, said imaging array sensor capturing images of precipitation on the window, said imaging array sensor generating an output indicative of said captured images; and a control operable to process said output to detect precipitation at a surface of the vehicle window in response to said output of said imaging array sensor, said control controlling an accessory of the vehicle in response to the precipitation detected reaching a threshold level of detected precipitation, said control being operable to control at least one other accessory of the vehicle in response to said output of said imaging array sensor, said at least one other accessory comprising at least one of a headlamp, a cruise control, and a lane departure warning.

55. The vehicular precipitation sensor of claim 54, wherein said imaging array sensor comprises one of a CMOS and a CCD sensor.

56. The vehicular precipitation sensor of claim 54, wherein said imaging array sensor is responsive at least to incident visible light 57. The vehicular precipitation sensor of claim 54, wherein said imaging array sensor is operable to detect precipitation which includes water droplets at an exterior surface of the vehicle window.

58. The vehicular precipitation sensor of claim 54, wherein said imaging array sensor is operable to detect precipitation which includes fog particles at an interior surface of the vehicle window.

59. The vehicular precipitation sensor of claim 54, wherein said imaging array sensor is operable to detect precipitation which includes water droplets at an exterior surface of the vehicle window and fog particles at an interior surface of the vehicle window.

60. The vehicular precipitation sensor of claim 54, wherein said accessory comprises a window wiper of the vehicle.

61. The vehicular precipitation sensor of claim 60, wherein said control is operable to control said window wiper of the vehicle in response to said control detecting precipitation at an exterior surface of the window.

62. The vehicular precipitation sensor of claim 61, wherein said control is operable to control a windshield wiper of the vehicle and a rear window wiper of the vehicle in response to said imaging array sensor detecting precipitation at the exterior surface of the window.

63. The vehicular precipitation sensor of claim 62, wherein said control causes the rear window wiper to cycle for every N cycles of the windshield wiper, wherein N is greater than one.

64. The vehicular precipitation sensor of claim 54, wherein said accessory comprises a movable window of the vehicle.

65. The vehicular precipitation sensor of claim 64, wherein said control is operable to control a movable window of the vehicle to close the movable window in response to said control detecting precipitation at an exterior surface of the window.

66. The vehicular precipitation sensor of claim 54, wherein said accessory comprises a defogging system of the vehicle.

67. The vehicular precipitation sensor of claim 66, wherein said control is operable to control a defogging system of the vehicle in response to said control detecting precipitation at an interior surface of the window.

68. The vehicular precipitation sensor of claim 54, wherein said threshold level of detected precipitation is adjustable in response to at least a level of ambient visible light present at the window.

69. The vehicular precipitation sensor of claim 68, wherein said threshold level of detected precipitation is decreased in response to a low level of ambient light at the vehicle window.

70. The vehicular precipitation sensor of claim 68, wherein said threshold level of detected precipitation is increased in response to a high level of ambient light at the vehicle window.

71. The vehicular precipitation sensor of claim 54, wherein said threshold level of detected precipitation comprises a first threshold value during night-time conditions and a second threshold value during day time conditions, said second threshold value being greater than said first threshold value.

72. The vehicular precipitation sensor of claim 54, wherein said at least one other accessory comprises a headlamp.

73. The vehicular precipitation sensor of claim 54, wherein said at least one other accessory comprises a cruise control.

74. The vehicular precipitation sensor of claim 54, wherein said at least one other accessory comprises a lane departure warning.

75. The vehicular precipitation sensor of claim 54, wherein said at least one other accessory comprises a headlamp and a lane departure warning.

\* \* \* \* \*